United States Patent [19]

Balch

[11] 4,231,544
[45] Nov. 4, 1980

[54] LOCKING CRANKCASE DRAIN VALVE ASSEMBLY

[76] Inventor: Duane C. Balch, 3827 Briarwood St., Napa, Calif. 94558

[21] Appl. No.: 31,466

[22] Filed: Apr. 19, 1979

[51] Int. Cl.³ .................................................. F16K 1/20
[52] U.S. Cl. .................................... 251/144; 251/297; 251/301; 137/351; 184/1.5
[58] Field of Search ............... 251/144, 301, 302, 297, 251/177; 137/351; 184/1.5

[56] References Cited

U.S. PATENT DOCUMENTS

| | | | |
|---|---|---|---|
| 303,656 | 8/1884 | Metzger et al. | 251/301 |
| 450,588 | 4/1891 | Lunkenheimer | 251/302 |
| 2,095,696 | 10/1937 | Hackel . | |
| 2,657,705 | 11/1953 | Gerhard et al. . | |
| 3,049,334 | 8/1962 | Montague . | |
| 3,299,904 | 1/1967 | Burke | 251/297 X |
| 3,677,369 | 7/1972 | Schramm . | |
| 3,874,478 | 4/1975 | Mantell, Jr. . | |
| 3,954,250 | 5/1976 | Grace | 251/144 |
| 4,025,048 | 5/1977 | Tibbitts . | |
| 4,086,981 | 5/1978 | Mitsui . | |

FOREIGN PATENT DOCUMENTS 17246 of 1894 United Kingdom ..................... 251/301

Primary Examiner—William R. Cline
Attorney, Agent, or Firm—James R. Cypher

[57] ABSTRACT

A crankcase drain valve assembly for replacing the standard oil drain plug commonly used for draining used oil from the crankcases of most internal combustion engines. The assembly includes a valve housing for mounting in the drain opening of the crankcase formed with a central passage therethrough and a transversely extending valve opening intersecting the central passage. A valve member is pivotally attached to the valve body and is formed to move in and out of sealing engagement with the central passage. A lever attached to the valve member permits opening and closing of the valve member without any special tools. The valve member is held in the closed position by rotating a lever until a boss on the lever arm is received in a detent in the valve housing.

5 Claims, 9 Drawing Figures

LOCKING CRANKCASE DRAIN VALVE ASSEMBLY

BACKGROUND OF THE INVENTION

The drain plug for crankcases of most internal combustion engines as described in U.S. Pat. No. 3,874,478 is essentially the same as the drain plugs of the first internal combustion engines. While the standard drain plug remains inexpensive to make and to install, the problems of changing the oil are well documented in U.S. Pat. No. 3,874,478. Several attempts have been made to replace the standard drain plug but thus far engine manufacturers have retained the plug in its original form. In 1937, Hackel, U.S. Pat. No. 2,095,696 provided a transversely mounted cylindrical plug biased to a closed position by a compression spring. The Hackel drainage device can be held in the open position but the many parts render the device prohibitively expensive. In 1953, Gerhard, U.S. Pat. No. 2,657,705 taught the use of a remotely controllable crankcase drain valve using a reciprocating slide valve closeable by a compression spring. Again, the Gerhard device was apparently too complex and expensive for general adoption.

In 1962, Montague U.S. Pat. No. 3,049,334 presented a drain valve and extension tool for removing used oil from the crankcase without the necessity of crawling under the car. The Montague device is relatively simple and consists of a hollow valve stem with external threads and a radial opening. The Montague valve could separate from the valve housing and drop into a used oil receiver if unthreaded too far resulting in a vexatious retrieval problem.

Schramm received U.S. Pat. No. 3,677,369 in 1972 on a unique ball valve to be used in draining used crankcase oil. The tolerances on such valves are critical and machining would be expensive.

Mantell, in U.S. Pat. No. 3,874,478 granted in 1975 provides a removable tapered plug in a special crankcase drain plug assembly. The plug is held in place by a spring clip, both of which could be lost or mislaid during an oil change.

Tibbitts was granted U.S. Pat. No. 4,025,048 on May 24, 1977 for a drain plug assembly. There are no parts which can become separated from the assembly during use but there are a number of parts which must be machined and several threaded parts, resulting in a costly device.

The most recent drain device for oil pans known to Applicant is Mitsui, U.S. Pat. No. 4,086,981 granted May 2, 1978. The Mitsui device includes a slide valve which is remotely operated and requires a compression spring to return the valve to a closed position. There are many parts and the device is obviously quite expensive.

SUMMARY OF THE INVENTION

The crankcase drain valve assembly of the present invention consists of only two parts, one of which pivots on the other. The moveable part is never separated from the other part and no special tools are required to open the valve. In most cases, the valve can be opened by hand without any tools at all.

The valve is designed so that the person operating the valve need never come in contact with the oil nor would any tool used to open the valve become soiled with the used oil from the crankcase.

The valve assembly is designed so that it can be made from either metal or plastic permitting the manufacturer to choose the least expensive method of making the assembly.

The valve may be opened or closed almost instantly obviating the leaking of oil along the underside of the oil pan which results in slow opening valves.

The drain assembly of the present invention has a positive locked closed position resulting in a valve which cannot vibrate loose resulting in loss of oil.

DESCRIPTION OF THE PREFERRED EMBODIMENTS

Figure 1:
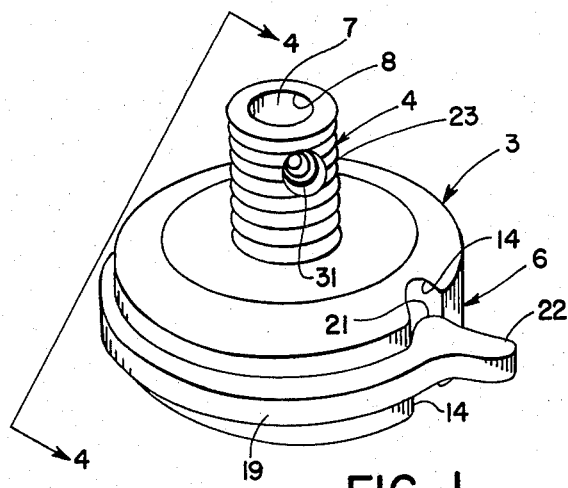
FIG. 1 is a perspective view of the crankcase drain valve assembly of the present invention in the closed position.
Figure 2:
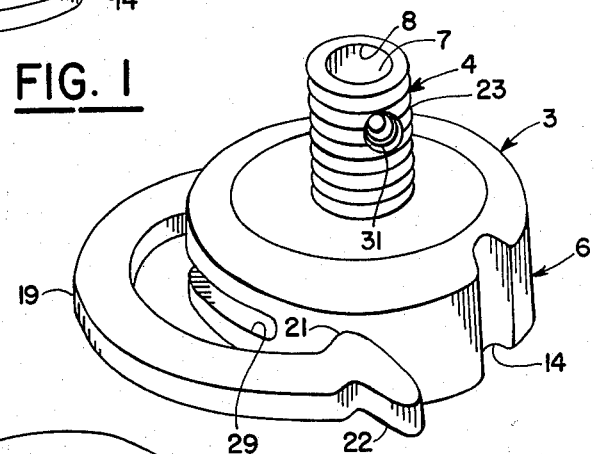
FIG. 2 is a perspective view of the assembly of FIG. 1 in the open position.
Figure 3:
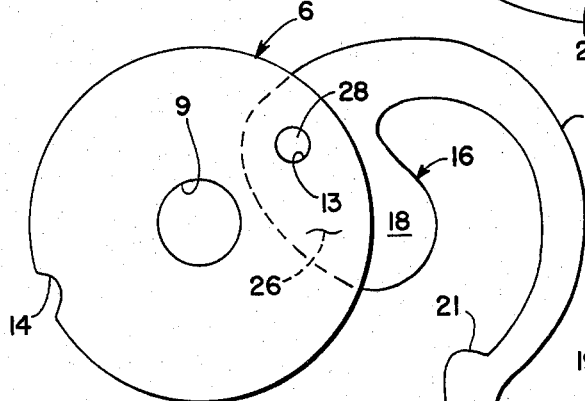
FIG. 3 is a bottom plan view of the assembly shown in FIG. 2.

The valve assembly of the present invention replaces the standard drain plug for a crankcase 1 shown in broken line and is mounted in the drain opening 2. The assembly consists of a valve housing 3 which includes a shank portion 4 for mounting in the drain opening. A valve body portion 6 is integrally connected to the shank portion. A central passage 7 is formed through the shank and valve body portions with an inlet 8 in the shank portion and an outlet 9 in the valve body portion. A valve body opening 11 is formed in the valve body portion and extends transversely through the central passage. A valve seat 12 surrounds the central passage. Hinge attachment means 13 is formed in the valve body portion and is positioned offset from the central passage. Lever holding means 14 is formed in the valve body portion.

The primary movable part is the valve member 16 which is formed for receipt within the valve opening and is formed with pivot means 17 for pivotal attachment to the hinge attachment means 13. The valve member includes a seat portion 18 formed for sealing engagement with the valve seat 12 surrounding the central passage 7. A lever 19 extends beyond the valve body portion 6. Lever attachment means 21 is formed in the lever for attachment to the lever holding means 14. Grip means 22 extends from the lever 19 for receiving a finger or tool for moving the lever and thereby moving the valve member 16 in and out of sealing engagement with the central passage 7.

The valve housing 3 could be connected to the crankcase by welding but preferably the shank portion 4 is formed with external threads 23 for threadable attachment in the threaded opening of the crankcase drain opening.

The valve member 16 could be made with a constant cross section for some applications but preferably the valve body opening 11 in the valve body portion 6 is formed with a tapered portion 24 in the area forming the valve seat 12. The valve member 16 is also formed with a tapered portion 26 in the area registering with the tapered portion of the valve opening in the valve body portion. The tapered portions insure a tight fitting closure.

The hinge attachment means 13 may be constructed in various ways. For example, indents could be formed in the body portion and registering bosses formed in the valve member 16. This could be the preferred way if the assembly 3 is manufactured from a plastic material. If the assembly is manufactured from metal, the hinge attachment means may consist of a pin opening 13 formed in the valve body portion axially alligned with the central passage but offset therefrom. The valve member is formed with a pin opening 17 registering with the pin opening in the valve body portion. A pin 28 registers with the pin opening in the valve body portion and the valve member.

The valve member could be held in the closed position by different mechanisms but the preferred construction is shown in the drawings. The lever 19 is formed of a material which will bend slightly and then return to its former position. Nearly all common metals and many plastics will give this necessary spring characteristic. The lever holding means 14 is positioned radially offset from the pivot means wherein the lever is in a stressed position when the attachment means 21 formed in the lever is attached to the lever holding means 14 formed in the valve body portion 6. The preferred form of the invention is illustrated in the drawings in which the lever holding means includes an indent 14 formed in the outer wall of the valve body portion. The attachment means formed in the lever includes a protrusion 21 extending radially inwardly for registering receipt with the indent 14 in the valve body portion when the valve member is in a closed position.

Lever 19 need not have any particular shape or configuration. As shown in the drawings, the preferred form is to form the lever with an arcuate shape having a curvature similar to the curvature of the valve body portion. A slot 29 may be formed in the side of the valve body portion for partial receipt of the lever when the lever is attached to the hinge attachment means.

It is important that the drain valve assembly be capable of completely emptying the crankcase of all used oil and sludge. The shank portion could be selected to have the same length as the thickness of the oil pan or a transverse passage 31 may be formed in the shank portion connecting the outer wall of the shank with the central passage 7 as shown in the drawings. The transverse passage may be spaced from the inlet opening of the central passage a distance to conform to the thickness of most oil pans.

One of the problems solved by Applicant's assembly which is present in the standard plug is the ability to drain the oil without flow along the underside of the oil pan. This is accomplished by the preferred form of the device by constructing the central passage 7 through the valve body portion below the valve opening 11 with a greater cross sectional area than the cross sectional area of the passage through the shank portion. This enlarged passage is designated by the additional number 7'. Gerhard, U.S. Pat. No. 2,657,705 states that a larger opening is preferably but he does not explain the reason.

Figure 9:
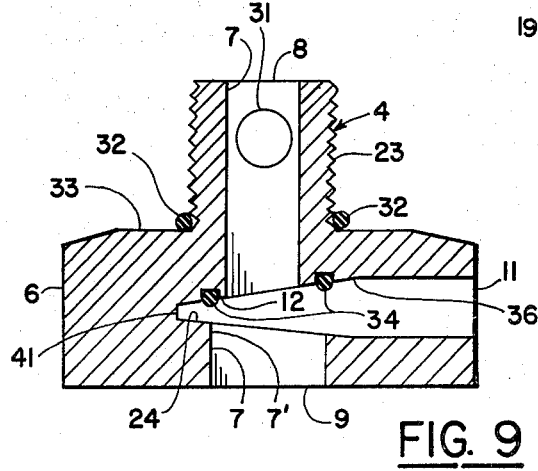
FIG. 9 is a cross section of an alternate form of the invention similar to the valve housing shown in FIG. 5.

In an alternate form of the invention shown in FIG. 9, an O-ring 32 is provided on the upper side 33 of the valve body portion. This would preclude leakage where the assembly was made from metal and tolerances were not close.

FIG. 9 also shows the use of an O-ring or other sealing means 34 in the seat area on wall 36 of the valve opening 11 formed in the valve body portion 6. Again, a seal would only be necessary where the assembly was made of metal and where tolerances to effect a tight seal without seals would be prohitively expensive.

While none of the dimensions set forth in this specification are believed to be critcal to the operation of the valve assembly and may be varied, a brief description of some of the dimensions of the valve assembly follows.

The outside of the valve housing may have the form of hexagon to permit the use of a wrench in installing the device. Preferably, however, the valve housing is circular so that no one will attempt to remove the assembly with a wrench. The outer diameter of the housing is 1.375 inches and is 0.500 inches thick. The central passage 7 may have a diameter of 0.25 inches in the shank portion and a diameter of 0.375 inches in the passage 7' in the valve body portion. The valve body opening 11 in the valve body portion is 0.1875 inches in height and extends into the body portion about 0.400 inches at the same thickness. The opening then tapers on a 5° angle and terminates 0.600 inches from the point that the opening begins to taper with a thickness of 0.082 inches in wall 41.

Figure 4:
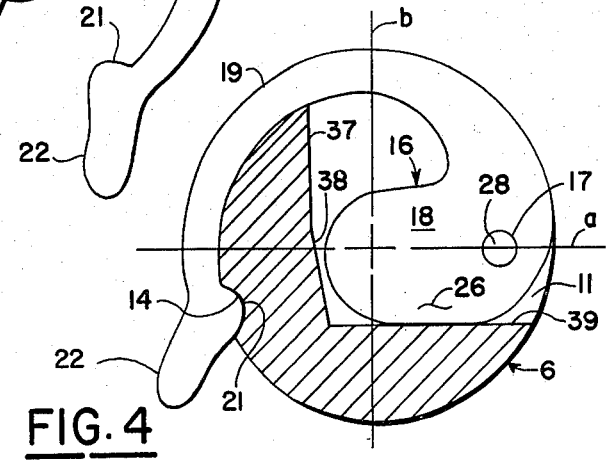
FIG. 4 is a cross sectional view of the assembly taken generally along line 4—4 of FIG. 1.
Figure 5:
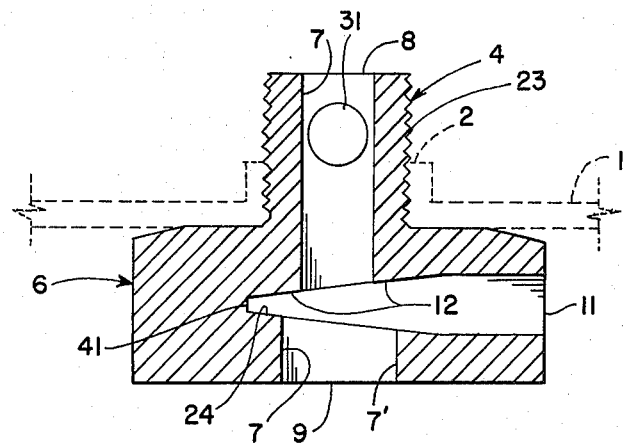
FIG. 5 is a cross section of the valve housing member taken along line 5—5 of FIG. 7.
Figure 7:
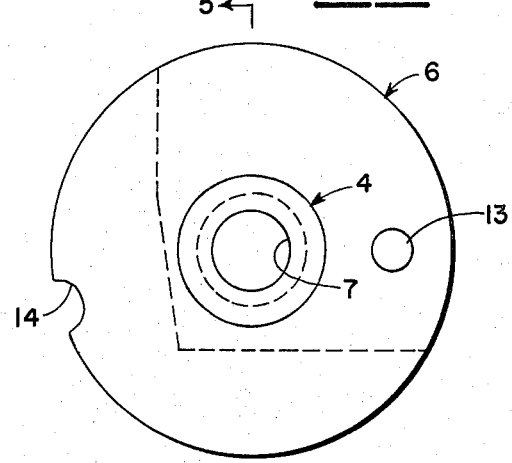
FIG. 7 is a top plan view of the valve housing of FIG. 5.
Figure 6:
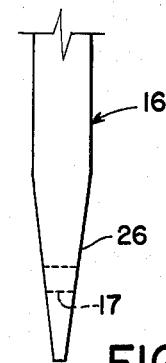
FIG. 6 is an end view of a portion of the valve member as taken generally along line 6—6 of FIG. 8.
Figure 8:
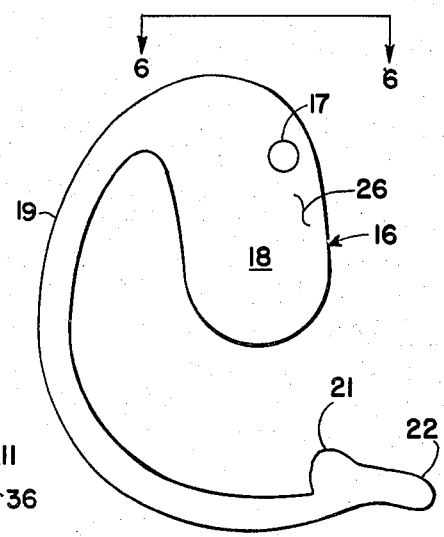
FIG. 8 is a top plan view of the valve member.

The size of the valve body opening may be seen with reference to FIG. 4. Assuming an axis "a" and an axis "b" which intersect at right angles and at a point in the center of the valve body, a $\frac{1}{8}$" pin opening 17 is drilled on axis "a" 0.25 inches from the outer edge of the valve body. Wall 37 is formed 1.00 inches from the edge and wall 38 begins at 0.375 inches from the left side of the valve body and interesects with wall 39 0.052 inches to the right. Wall 39 is 0.375 inches from axis "a" and parallel thereto.

Indent 14 is a 3/16 inch half circle and is centered on a radius line 15° from axis "a".

After installation of the valve housing by threading the shank portion 4 into the drain opening 2, operation of the device is simple. To open the valve grip means 22 is grasped by the fingers or a tool and pulled outwardly until attachment means 21 releases from lever holding means 14. Lever 19 is rotated about pin 28 until seat portion 18 uncovers passage 7. Used oil enters through inlet 8 and/or transverse passage 31 and flows through passage 7 and discharges from outlet 9. To close the valve, the reverse procedure is followed.

In addition to its use in crankcases of internal combustion engines, the drain valve assembly of the present invention may be used to drain liquids or powders from drums or to drain liquid from radiators of internal combustion engines. Further, the assembly could be used to drain fluids from automobile differentials and automatic transmissions.

I claim:

1. A locking crankcase drain valve assembly comprising:
   a. a valve housing (3) having an outer wall for mounting in the drain opening (2) of a crankcase (1), including:
      (1) a shank portion (4) for mounting in said drain opening,
      (2) a valve body portion (6) integrally connected to said shank portion, (3) a central passage (7) through said shank and valve body portions having an inlet (8) in said shank portion and an outlet (9) in said valve body portion, (4) a valve body opening (11) formed in said valve body portion extending transversely through said central passage and forming a valve seat (12) surrounding said central passage, (5) hinge attachment means (13) formed in said valve body portion positioned offset from said central passage, (6) lever holding means (14) formed in said valve body portion at a selected distance from said hinge attachment means;

b. a valve member (16) formed for receipt within said valve opening and formed with pivot means (17) for pivotal attachment to said hinge means including, (1) a seat portion (18) formed for sealing engagement with said valve seat surrounding said central passage, (2) a spring lever (19) extending beyond said valve body portion having engaged and unengaged positions, (3) lever attachment means (21) formed in said lever at a selected distance from said hinge attachment means (13) which in its unstressed state is less than the distance of said lever holding means (14) from said hinge attachment means (13) for engaged attachment to said lever holding means (14) so that when said lever is in said engaged position said lever is in tension, (4) grip means (22) extending from said lever for receiving a finger or tool for moving said lever and thereby moving said valve member in and out of sealing engagement with said central passage;

c. said valve body opening in said valve body portion is formed with a tapered portion (24) in the area forming said valve seat; and d. said valve member is formed with a tapered portion (26) in the area registering with said tapered portion of said valve opening in said valve body portion so that when said lever is in said engaged position, said tapered portion (26) is in compression with said tapered portion (24) of said valve body.

2. A valve assembly described in claim 1 comprising:

a. said hinge attachment means consists of a pin opening formed in said valve body portion axially alligned with said central passage but offset therefrom;

b. said valve member is formed with a pin opening registering with said pin opening in said valve body portion; and c. a pin (28) registering with said pin opening in said valve body portion and said valve member.

3. A valve assembly as described in claim 1 comprising:

a. said lever holding means including an indent formed in the outer wall of said valve body portion; and b. said attachment means formed in said lever includes a protrusion extending radilly inwardly for registering receipt with said indent in said valve body portion when said valve member is in a closed position.

4. A valve assembly described in claim 1 comprising:

a. said lever is formed in an arcuate shape; and b. a slot formed in the side of said valve body portion for partial receipt of said lever when said lever is attached to said hinge attachment means.

5. A valve assembly as described in claim 1 comprising:

a. said central passage through said valve body portion below said valve body opening is greater in cross sectional area than through said shank portion.

* * * * *